Aug. 12, 1958
H. J. B. LAND
2,847,147
LIQUID DISPENSING DEVICE
Filed Oct. 4, 1955
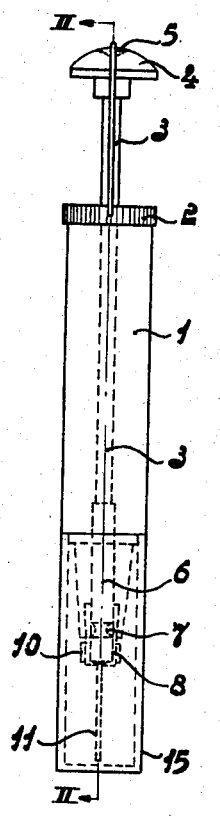
Fig.1
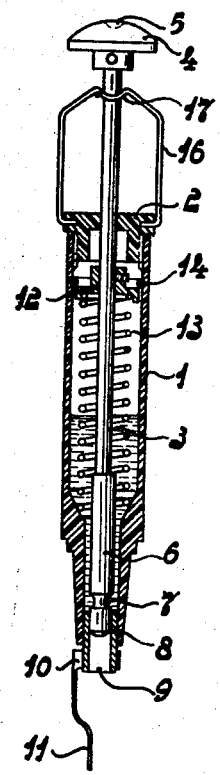
Fig.2
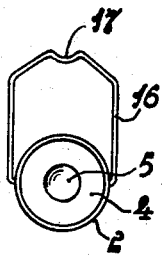
Fig.3
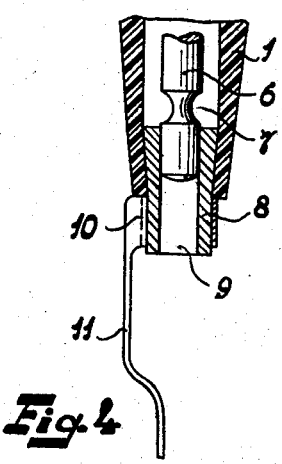
Fig.4
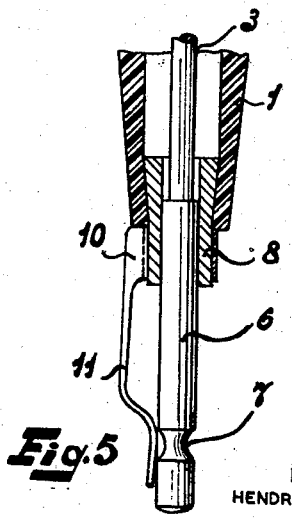
Fig.5
INVENTOR
HENDRIK JAN BERNARD LAND
BY 
AGENT

United States Patent Office 2,847,147
Patented Aug. 12, 1958

2,847,147
LIQUID DISPENSING DEVICE

Hendrik Jan Bernard Land, Hilversum, Netherlands, assignor, by mesne assignments, to North American Philips Company, Inc., New York, N. Y., a corporation of Delaware Application October 4, 1955, Serial No. 538,358

Claims priority, application Netherlands October 29, 1954

6 Claims. (Cl. 222—341)

The present invention relates to a liquid dispensing device. More particularly, the invention relates to a device comprising a container, which supplies a certain quantity of liquid from the container to a given place by means of a movable plunger which, when the device is not in use, closes the discharge opening of the container. In accordance with the present invention, the plunger comprises a chamber which is within the container when the device is not in use and the capacity of which is equal to the required quantity of liquid. The device further comprises means to displace the plunger in such manner that the chamber is moved beyond the container, during which displacement the liquid carried in the chamber is transferred to a member which is fixedly secured to the device outside the container and from which the liquid is brought to the desired place.

Consequently, the device in accordance with the invention permits a predetermined quantity of liquid to be brought from the container to a given place, which quantity remains substantially the same. If the container is filled, for example with oil, the places to be oiled do not receive too much or too little oil. The device of the present invention may, for example, be successfully used, in automatic telephone exchanges where movable parts of the selecting mechanisms must be continually provided with a small quantity of oil. The device is also suitable for oiling sewing machines, clocks, office and domestic machines and similar mechanisms, which are oiled from time to time with a substantially small quantity of oil.

In the preferred embodiment of the invention, the member to which the liquid is transferred through the chamber, preferably consists of a resilient bent pin, one end of which is secured to the device. The other end of the pin, which is substantially straight, extends to a point which is just short of the point to which the end of the fully depressed plunger having the chamber extends during operation. When the plunger having the chamber is depressed the end of the pin is urged slightly outwards so that it bears on the said plunger.

In order that the invention may be readily carried into effect it will now be described with reference to the accompanying drawing, given by way of example, in which:

Fig. 1 is an elevational view of the device of the present invention, when not in use;

Fig. 2 is a longitudinal sectional view of the device of Fig. 1, when ready for use;

Fig. 3 is a plan view of the device of Fig. 2;

Fig. 4 shows a part of the container with the plunger, chamber and transfer member of Fig. 2, on an enlarged scale; and Fig. 5 shows, on an enlarged scale, the same parts as shown in Fig. 4, but with the plunger and the chamber in the lowest (transfer) position.

In the drawing, a container 1 is closed at the top by means of a cap nut 2. A rod 3 within the container carries at its top a knob 4 furnished with a cavity 5. The rod 3 has a larger diameter at its lower end, thus forming a plunger 6 provided with a chamber 7. The container 1, which is internally narrowed at its lower end, comprises an insert 8 with an opening 9 in which the plunger 6 fits. A portion of the insert 8 carries an annular support 10 to which a resilient lubricating pin 11 is secured. As shown in Figs. 2 and 4, the end of the pin 11, when the plunger is not depressed, extends just short of the point to which the depressed plunger 6 having the chamber 7 extends. When the plunger 6 is depressed, the pin 11 is urged slightly outwards as shown in Fig. 5. The rod 3 has secured to it a closure member 12, a compression spring 13 being arranged between the member 12 and a narrowed portion of the container 1. A ring 14 within the container 1 prevents the member 12 and consequently the rod 3 from moving up, by the action of spring 13, to a point such that the lower end of the plunger 6 leaves the opening 9. A cap 15, shown in Fig. 1, which is easily removable from the container 1, serves to protect the pin 11 and to collect any liquid escaping from said container when the device is not in use. A resilient clasp 16, shown in Figs. 2 and 3, is pivotally fitted in the cap 2. The clasp 16 is so positioned that when the device is not in use, the cavity 5 of the knob 4 is just below the curved portion 17 of the clasp 16. The rod 3 may thus be locked in position.

The device of the present invention operates as follows. The container 1 may be filled, for example with oil, by unscrewing the cap 2. The oil flows past the member 12, which is fitted with some amount of play in the container 1, to the lower end of said container, which is filled to approximately ¾ of its capacity. Subsequently the cap 2 is again screwed on to the container. If a little oil, determined by the capacity of the chamber 7, is to be brought to a given place, the cap 15 is removed and the clasp 16 is removed so that the rod 3 assumes the position shown in Fig. 2. Subsequently, the knob 4 is depressed so that the plunger 6 having the chamber 7, descends until the said chamber is just opposite the end of the lubricating pin 11. Upon the release of the knob 4, the plunger 6 and the chamber 7 resume the positions shown in Figs. 2 and 4, but the oil initially contained in the chamber 7 is left on the lubricating pin 11. When the end of the pin 11 is placed on the object to be oiled, a drop of oil flows from the said pin to the location to be oiled, if the device is held substantially vertically. If the viscosity of the oil is low and/or if the ambient temperature is not too low, an inclination of the pin 11 to an angle of approximately 45° is sufficient to cause the oil to flow from the said pin. The quantity of oil supplied is only determined by the capacity of the chamber 7. For different purposes and different oils the lower end of the plunger 6 may be made exchangeable so that the capacity of the chamber 7 may be varied in the same device. If the container 1 is made of transparent, for example thermoplastic or thermohardening, synthetic material, the amount of liquid in the container 1 may be visually determined.

If the lower part of the plunger 6 fits adequately in the insert 8, practically no liquid escapes from the container when the device is not in use, especially since the chamber 7 is filled with air after use. This permits the device, when locked and furnished with the cap 15, to be carried as a fountain pen or a pencil.

While the invention has been described by means of a specific example and in a specific embodiment, I do not wish to be limited thereto, for obvious modifications will occur to those skilled in the art without departing from the spirit and scope of the invention.

What is claimed is:

1. A device comprising a container adapted to hold a liquid and having a discharge opening, a plunger, said plunger having an end portion and means in the said end portion for transporting a predetermined quantity of liquid, means mounting said plunger in said container in a manner whereby said end portion of said plunger continuously blocks said discharge opening, means moving said plunger into and out of said container, and means for transferring said predetermined quantity of liquid from said first-mentioned means to a desired point when said plunger is projected out of said container, said last-mentioned means comprising a guide pin member secured to one end to said container and adapted to contact said desired point at the other end thereof.

2. A device as claimed in claim 1, wherein the said last-mentioned means comprises a resilient guide pin member having one end affixed to said container, said guide member being positioned to contact said desired point at the other end of the said member and to contact said first-mentioned means at an intermediate portion of the said member.

3. A device as claimed in claim 2, wherein said other end of said guide pin member extends to a point which is in closer proximity to said container than the point of maximum extension of said plunger from the said container.

4. A device comprising a container adapted to hold a liquid and having a discharge opening, a plunger, said plunger having an end portion with a recess therein, said recess being adapted to transport a predetermined quantity of liquid therein, means for slidably positioning said plunger in said container in a manner whereby said end portion of said plunger continuously blocks said discharge opening, means permitting said plunger to be slidably moved in said container in a manner whereby said recess is positioned within the said container in several positions of the said plunger and whereby the said recess is positioned outside the said container in several positions of the said plunger, and means for transferring said predetermined quantity of liquid from said recess to a desired point, said last-mentioned means comprising a guide pin member secured to an end of said container and positioned adjacent to said recess in an extended position of said plunger.

5. A device as claimed in claim 4, wherein the said last-mentioned means comprises a resilient guide pin member having one end affixed to said container, said guide member being positioned to contact said desired point at the other end of the said member and to be adjacent to said recess at an intermediate portion of the said member when said plunger is in an extended position.

6. A device as claimed in claim 5, wherein said other end of said guide pin member extends to a point which is in closer proximity of said container than the point of maximum extension of said plunger from the said container.

References Cited in the file of this patent

UNITED STATES PATENTS

| | | |
|---|---|---|
| 1,951,107 | Parker | Mar. 13, 1934 |
| 2,198,499 | Jennings | Apr. 23, 1940 |